United States Patent [19]

Adams et al.

[11] Patent Number: 4,578,760

[45] Date of Patent: Mar. 25, 1986

[54] ARRANGEMENT FOR CONTROLLING AN ELECTRONIC TAXIMETER

[75] Inventors: Jürgen Adams; Hans-Peter Scholl, both of Villingen-Schwenningen, Fed. Rep. of Germany

[73] Assignee: Kienzle Apparate GmbH, Villingen-Schwenningen, Fed. Rep. of Germany

[21] Appl. No.: 459,671

[22] Filed: Jan. 20, 1983

[30] Foreign Application Priority Data

Jan. 21, 1982 [DE] Fed. Rep. of Germany ..... 82100393

[51] Int. Cl.⁴ ........................ G07B 13/04; G06F 15/20
[52] U.S. Cl. .................. 364/467; 235/30 R; 340/365 R; 340/365 VL; 364/709
[58] Field of Search .................. 340/365 R; 364/467, 364/900, 709; 235/30 R; 200/51

[56] References Cited

U.S. PATENT DOCUMENTS

| | | | |
|---|---|---|---|
| 3,860,807 | 1/1975 | Fichter et al. | 364/467 |
| 3,908,100 | 9/1975 | Richard et al. | 340/365 R |
| 3,931,508 | 1/1976 | Kelch | 364/467 |
| 3,937,933 | 2/1976 | Warkenton | 364/467 |
| 4,094,246 | 7/1978 | Osborne et al. | 340/365 R |
| 4,167,040 | 9/1979 | Heritier et al. | 364/467 |

OTHER PUBLICATIONS

IBM Tech. Discl. Bull.; Bellamy et al; "Alterable Keyboard"; vol. 24, No. 7B, Dec. 1981; pp. 3937-3938.
Barker et al; "Dummy Key Implementation"; IBM Tech. Discl. Bull.; vol. 15, No. 6; Nov. 1972; pp. 1936-1931.

Primary Examiner—Errol A. Krass
Attorney, Agent, or Firm—Toren, McGeady, Stanger, Goldberg & Kiel

[57] ABSTRACT

An arrangement for the control of the quantity of the functions to be called in an electronic taximeter. In order to be able to adapt the device to the most multi-purpose of demands, a greater or fewer number of recesses with keys A1 to A8 or with corresponding fill-in pieces can be provided in a key strip in a taximeter housing. A switch K1 through K8 is assigned to each key A1 through A8; the key information is supplied to the electronics and releases different key interrogation programs according to the number of keys present. With a smaller quantity of keys, several functions are assigned to the keys partially; with a larger quantity of keys, each key preferably releases only one function.

11 Claims, 9 Drawing Figures

ARRANGEMENT FOR CONTROLLING AN ELECTRONIC TAXIMETER

FIELD OF THE INVENTION

The present invention is directed to an arrangement for controlling an electronic taximeter and, more particularly, an arrangement to improve the flexibility of a function-keyed electronic taximeter.

BACKGROUND OF THE PRESENT INVENTION

In electronic taximeters, it is usual to provide three to eight keys in order to control the various functions of the taximeter. Most electronic taximeters have three to four keys to release the various functions of the device. It has now become common, by virtue of the flexibility of microprocessing techniques, to equip taximeters with quite a number of additional functions which were previously not usual in mechanical taximeters, such as, e.g., sum formation, clearing of checking counter states (positions), etc. Accordingly, it is necessary when equipping the device with three to four control keys to make the releasing of the function dependent on the combined actuation of several keys. This means that the operation of the taximeter is made more difficult since it requires the taxi driver to refer to the operating instructions for releasing the special functions in order to determine which combination of keys will result in the release of a desired function.

It would be possible to simplify the operation of the device by means of the arrangement of a larger number of keys. This has also been done in various cases. However, in some cases, licensing regulations prohibit this, i.e., in various countries there are license regulations which state that the taximeters can only be brought into the individual function positions by means of a determined switching sequence.

It is already known, for example, from DE-OS 22 02 865 to equip taximeters with a large number of keys and to feed the key signals via a coder matrix to a register in which the actuated key coding remains stored until a new signal is given by means of the key.

The object of the present invention then is to provide an arrangement for controlling an electronic taximeter which makes it possible to furnish the device without great extra expenditure, with a smaller quantity of keys in which several functions can be assigned to each key under certain circumstances or with a very much greater quantity of keys, e.g., twice as great, each of which is then assigned preferably to only a single function.

SUMMARY OF THE PRESENT INVENTION

Accordingly, the invention is directed to an arrangement for controlling an electronic taximeter with respect to its various switching states by means of keys which transmit coded signals to an input circuit via a coder matrix. The improvement comprises that a key strip is provided on the housing which is arranged to hold a predetermined number of keys up to a maximum number of keys but which can be occupied by more or less keys; a number of switches is present in the housing corresponding to the maximum number of keys.

Tariff memory means for holding tariff information and system memory means for holding system program information are included. The system program information provides key interrogation cycles for assigning several functions to a key or key code when there are few keys available and preferably assigning only one function to each key or key code when there are many keys available. The key interrogation cycles operate by the use of information or jump instructions stored in the tariff memory means.

The provided construction and control of the taximeter with respect to its key functions has the advantage that one can adapt the device in the most simple manner to the various needs of the customers in the individual tariff zones but also to the various license regulations corresponding to the individual countries.

By means of a slight redundancy in the hardware component parts, one thus provides a control for the taximeter which is as flexible as possible without requiring complicated reconstructions in the case of a possible modification of the basic requirements in the licensing regulations. It is also possible, at the same time, to equip the taximeter with additional functions, which makes the taximeter useful in different countries, by means of the employment of an additional program unit.

According to a further characteristic feature of the invention, the key strip is constructed in such a way that it contains a recess for each of the maximally provided number of keys, in which recess either a flexible spring-supported key can be inserted which projects over the holding strip or a fill-in piece closes the recess. The fill-in piece is either arranged level with the key strip or is even set back somewhat relative to the key strip. Such a construction of the key strip has the advantage that it avoids blind keys, that is, keys which have no function, so that the taxi driver cannot be confused by the presence of such blind keys.

For a better understanding of the present invention, reference is made to the following description and accompanying drawings, while the scope of the present invention will be pointed out in the appended claims.

BRIEF DESCRIPTION OF THE DRAWINGS

The invention is further described and illustrated by the accompanying drawings.

In the drawings.

DESCRIPTION OF THE PREFERRED EMBODIMENTS

Figure 1:
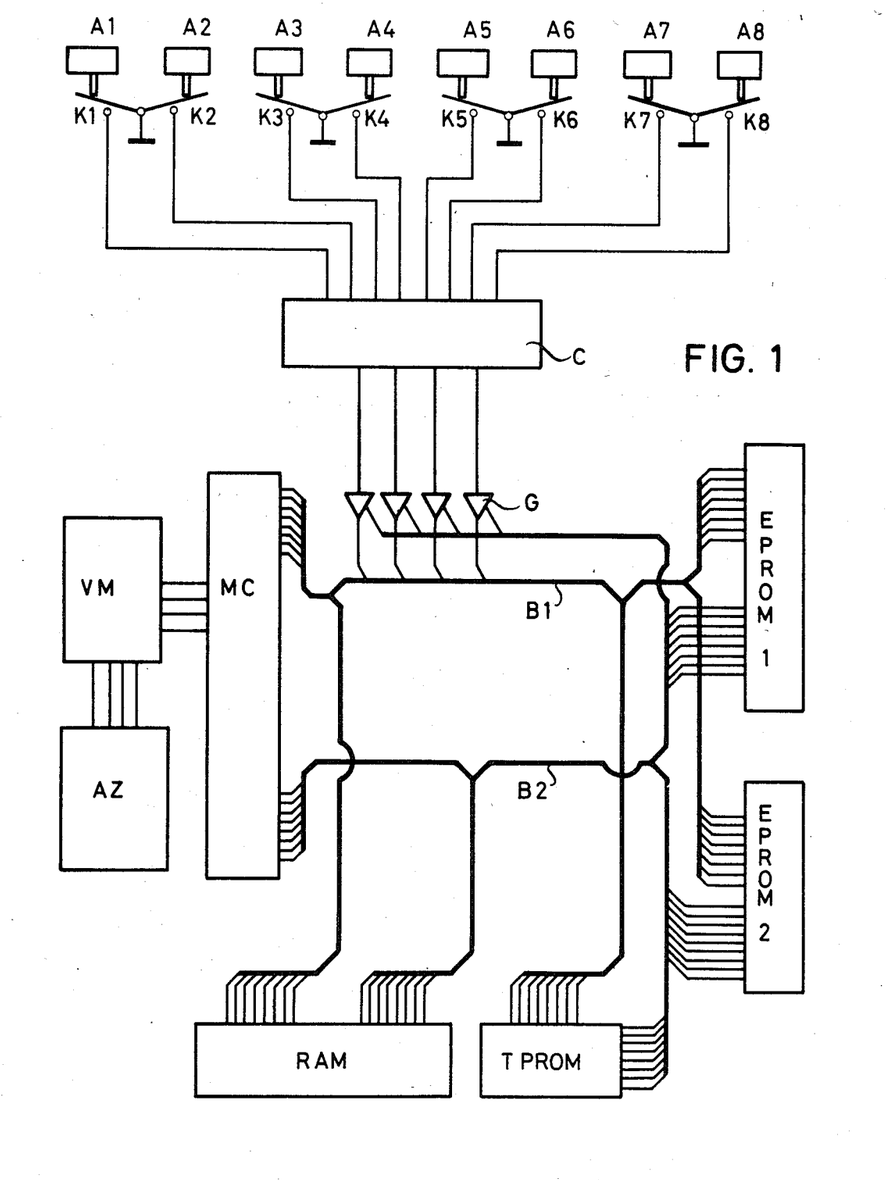
FIG. 1 is an overall circuit diagram in schematic and block form of the electronic taximeter according to the invention.

As shown in FIG. 1, the taximeter can be equipped with a maximum of eight key units A1 through A8, each of which being able to temporarily close a contact K1 through K8 when actuated. In each case, one pole of these contacts K1 through K8 is grounded, the other poles being connected with a coder matrix C in the form of a diode matrix. The coder matrix C is connected to the data bus B1 via gates G in such a way that the signals which are removed at the coder matrix C can be supplied to the microprocessor MC. The data bus B1 also connects to the microprocessor MC with the EPROM1 system program, with a RAM read-write memory and with the TPROM tariff memory which is a PROM or some other programmable unit. Aside from the EPROM1, the taximeter can also have an additional system program EPROM2, if the capacity of the EPROM1 is not sufficient for realizing the desired functions of the device. The microprocessor MC is an eight bit microprocessor which can either have an integrated system program or can function together with the EPROM1 in its simplest form. The form selected depends on the number of pieces in which the device is to be sold in one version or another. The TPROM tariff memory can either be a throw-away part which is only programmable once, or it can also be an erasable and reusable memory according to the desired arrangement. An address bus B2, also composed of a plurality of conductors, similarly connects the microprocessor MC, the read-write memory RAM, the tariff memory TPROM, the key gates G and the system memories EPROM1 and, optionally, EPROM2. The microprocessor MC is connected with an indicator AZ via amplifier VM; this amplifier VM also effects the multiplexing of the indicator AZ.

Figure 2:
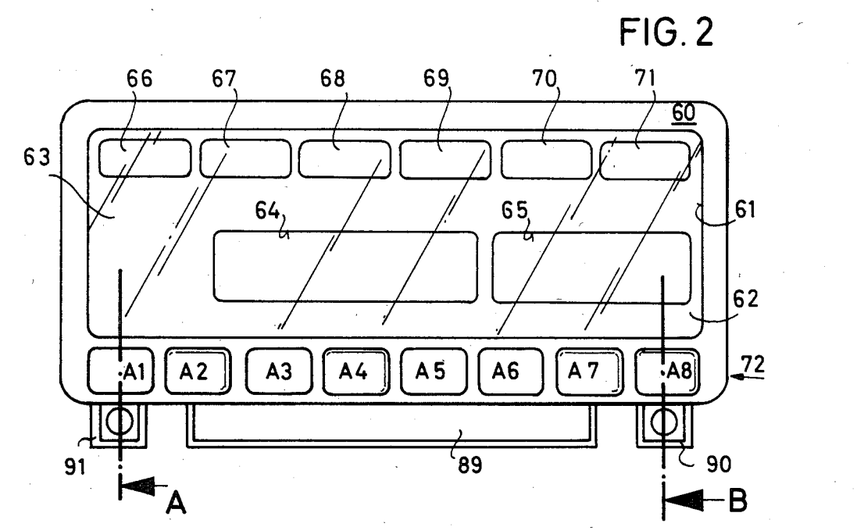
FIG. 2 is a front view of the device.

As already mentioned, the keys A1 through A8 can be arranged as desired, i.e., in place of any one of the keys A1 through A8 a so-called fill-in piece can be employed. How this is specifically done is described in the following with reference to FIGS. 2 through 6. FIG. 2 is a front view of the electronic taximeter. A recess 61 is provided in a front frame 60 which is attachable from the front to the rest of the housing. The recess 61 is filled in by means of a front window 62. Behind the front window 62 is found the face plate 63 in which is provided recesses 64, 65 for the fare price and additional charges and recesses 66 through 71 for indication of the different rate states and other additional information. The key strip 72 is present in the lower part of the front frame 60, in which key strip 72 the keys A1 through A8 can be inserted in corresponding recesses 73. However, as shown in FIGS. 3 and 4, corresponding fill-in pieces F can also be inserted in place of the keys A1 through A8.

Figure 3:
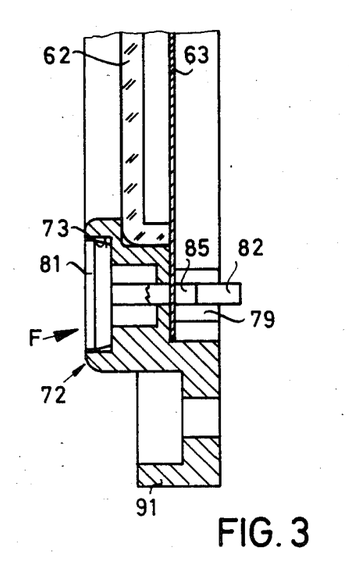
FIGS. 3 and 4 are detailed representations of the front side of the device along section lines A–B according to FIG. 2.
Figure 4:
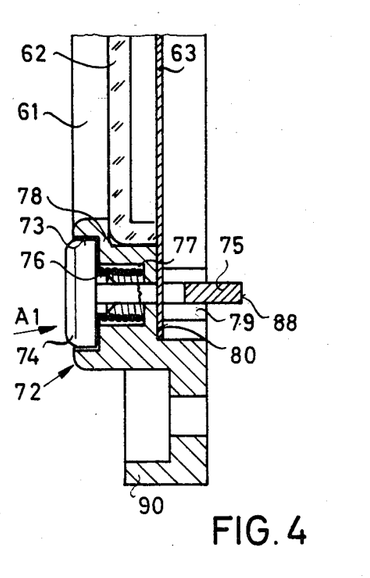
Figure 5:
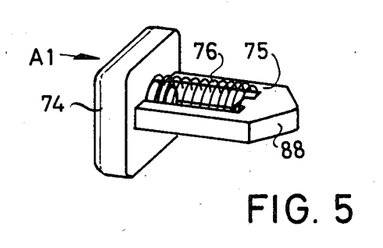
FIGS. 5 and 6 illustrate the keys and the fill-in pieces in detail according to FIGS. 3 and 4.

FIGS. 3, 4 and 5, 6, in particular, show the constitution of a key A1 and of a fill-in piece F, respectively. Each key, for example, the key A1, is composed of a key button 74 and a key shaft 75 constructed in U-shape. Guide projections for the key spring 76 are provided on the key button 74 as well as on the key shaft 75 so that the spring 76 need only be inserted loosely. Moreover, springs 76 are supported, as can be seen in FIG. 4, on corresponding shoulders 77 of the key strip 72. The key buttons 74 find their support in the pressed state on a corresponding collar 78 in the recesses 73. With the help of the tips 88 of the key shafts 75, the keys A1 through A8 act on the contacts K1 through K8. The key shafts 75 are guided in corresponding guides 79 of the key strip 72. The face plates 63 are supported between the projections 79 by shoulders 80, wherein the key shaft 75 is stopped at the shoulder 80 of the face plate 63 when spring 76 is released.

Figure 6:
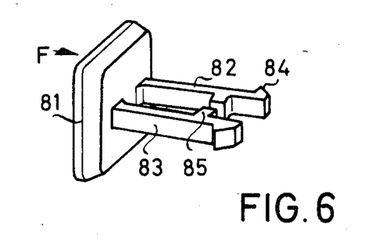

Fill-in pieces F can be understood from FIGS. 3 and 6. Each fill-in piece has an expanded part 81 whose surface dimensions correspond to the key button 74, that is, it fully fills up the recess 73 in the key strip 72. Only with respect to its height is the part 81 reduced in such a way that it does not project above the key strip 72, and is even optionally slightly set back relative to the key strip. Two legs 82 and 83 are arranged on each part 81 of a fill-in piece F, which legs 82 and 83 are provided with catches 84 and stops 85. For inserting the fill-in pieces F, the legs 82 and 83 are pressed together in such a way that they can be introduced into the recesses 73 and between the projections 79 of the key strip 72. Consequently, the legs 82 and 83 spring apart elastically in such a way that the fill-in pieces F are supported with their catches 84 on the reverse side of the projections 79 and are thus immovably locked.

Thus, in each of the recesses 73, one can either arrange a key A1 through A8 which then actuates a contact K1 through K8 to the extent that it is pressed into the position shown in FIG. 4, or one can arrange a fill-in piece F, which is immovably locked in the key strip 72 in such a way that the contact K1 through K8 assigned to this fill-in piece cannot be actuated.

The front frame 60 is provided with a center shoulder 89 for attaching a type plate and two lateral shoulders 90 and 91. These two shoulders 90 and 91 serve for screwing the housing and attaching a corresponding lead seal.

It is preferable to keep the fill-in pieces F the same color as the front frame 60 with the key strip 72. The keys A1 through A8 can optionally be designed with colors differing from the fill-in pieces as well as colors which differ from one key to another. Colors different from one another can be of special interest because, for example, one key is the main function key and for this reason should be made to stand out relative to the other keys.

Figure 7:
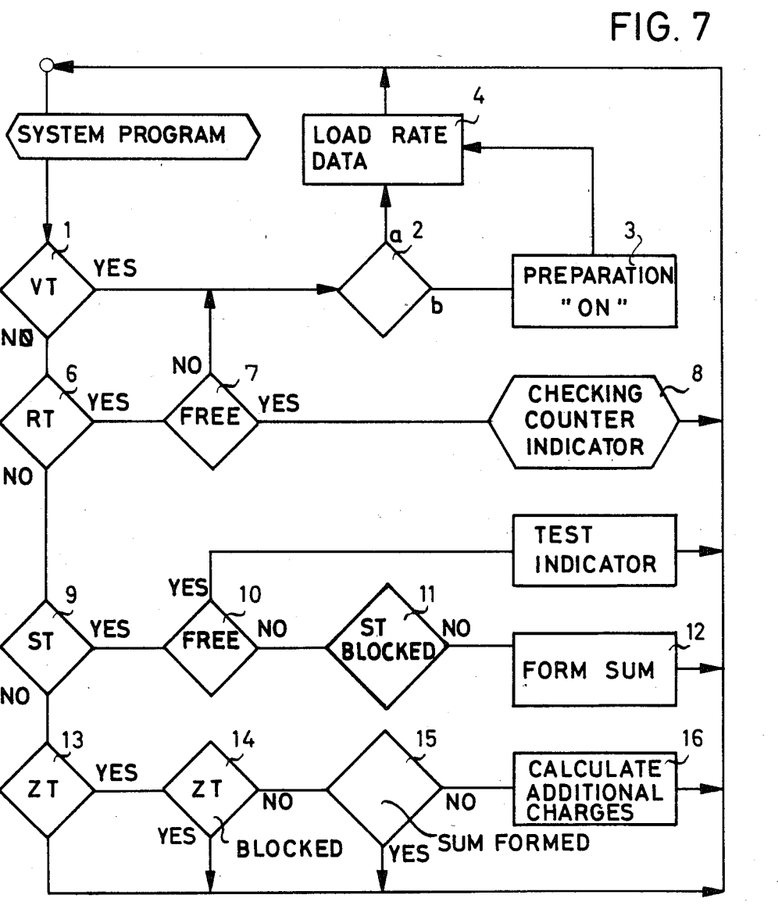
FIG. 7 shows an algorithm of a program for the interrogation of four keys.
Figure 8:
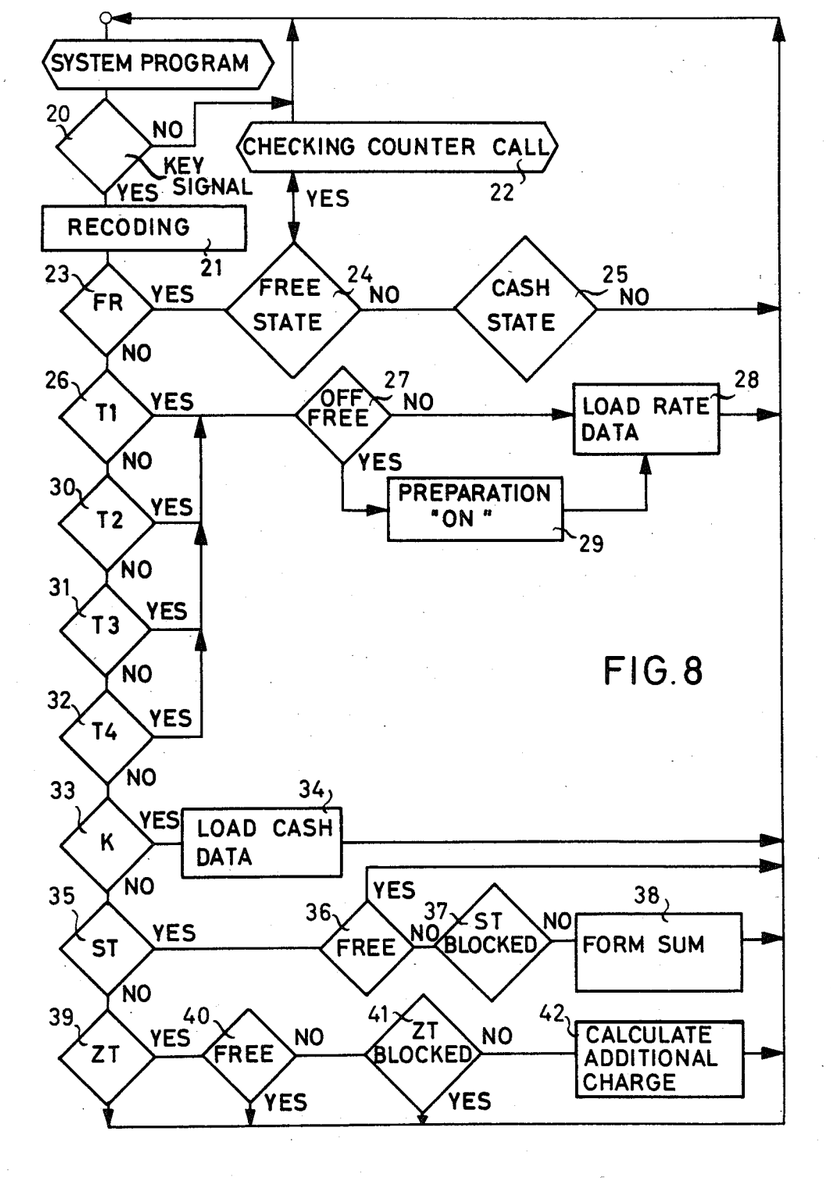
FIGS. 8 and 9 show the algorithms for interrogation of eight different keys.
Figure 9:
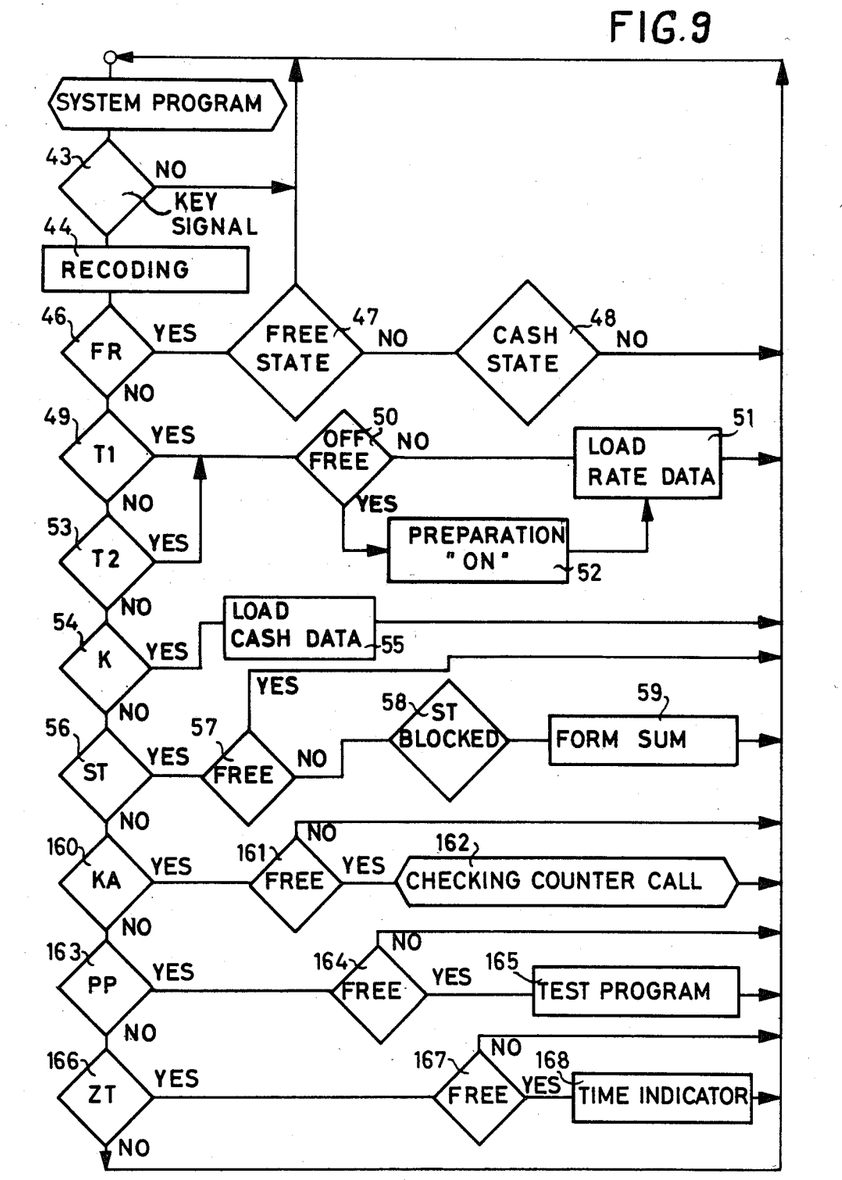

Algorithms of several key interrogation programs are shown in FIGS. 7 through 9; FIG. 7, in fact, shows an example useful for taximeters with four keys in which four recesses 73 of the key strip 72 are thus provided with fill-in pieces F while keys A1 through A4 are provided in the remaining recesses. In FIGS. 8 and 9, on the other hand, the algorithms for two alternative key interrogation programs are shown which are conceivable with the employment of eight keys, A1 through A8. It is self-evident that all of these programs, as shown in FIGS. 7 through 9, permit desired modifications so that the taximeters can be varied in any conceivable way with respect to its functions.

Before proceeding with the explanation of the algorithm according to FIGS. 7 through 9, several points concerning hardware according to FIG. 1 should be briefly discussed. In the tariff memory TPROM, not only are the tariff data but also the respective key information assigned to the tariff data stored in the present taximeter. This has the advantage, particularly with a smaller quantity of function keys, for example, four keys, that a corresponding function can be assigned to each key by the user. A further advantage is that determined function sequences can be set by means of the tariff memory as well. Such a storing of key information and appertaining tariff data in the tariff memory is not necessary, however. Preferably, it is possible to store only jump instructions in the tariff memory and to call, by means of the latter, an alternative key interrogation program in the system program in the system memories EPROM1 and/or EPROM2 according to what seems to be the most favorable way with respect to the system. The principal difference between the TPROM and the EPROM1 and EPROM2 memories is that the data in the TPROM tariff memory can vary from city to city whereas the system programs which are filed in the the EPROM1 and EPROM2 memories can vary from country to country since, as a rule, the basic structure of the tariff is set down for each country in a regionally uniform regulation for all taximeters permitted in this country.

In the flow chart according to FIG. 7, only four keys are present, specifically, a forward switching key VT by means of which, in every actuation of this key, the taximeter is switched ahead from one function position to the next function position; and a rearward key RT in which it is possible to switch back, for example, from rate II to rate I or from CASH to rate IV, etc., but not, e.g., to switch back into the FREE position. The third key is the summing key ST with which the sum of the fare price and additional charge can be formed in the OCCUPIED position and an additional charge key ZT with which the additional charges can be fed in, i.e., in each actuation of this key a determined amount is added in the additional charge counter. The keys in FIGS. 7 to 9 are not designated with A1 through A8 but purposely with designations such as VT, RT, etc., because the concern here is more with the illustration of their function.

With a system program, the key interrogation program, such as is represented in FIGS. 7 through 9 in different variations, is, in each case, a sub-program composed of a quantity of decisions and functions. Firstly, in explanation of FIG. 7: the forward key VT is interrogated 1, whether it is pressed or not. If it is pressed, then it will be decided according to 2 whether (a) the preceding position was a desired rate position I through III, or whether (b) the preceding position was the FREE position. In (a), only the correspondingly new rate data are removed from the tariff memory, that is, for example, the values for the continuous switching unit in distance and time. If, on the other hand, the preceding position (b) was the FREE position, then this switch-on signal must be prepared in each case from the FREE position in rate I, II or III by carrying out different settings, and the like. Only then can the tariff or rate data, respectively, for rate I or II or III be loaded according to 4.

If the forward key VT according to 1 is found not to be pressed, then the rearward switching key RT according to 6 is interrogated next. If this key is actuated, then it is additionally established according to 7 whether the taximeter is located in the FREE position. In this case, key RT has two functions. If the taximeter is in the FREE position, then the checking counter indicator according to 8 is carried out, meaning that the individual checking counter states are called one after the other from the main memory RAM and transmitted to the indicator AZ in order to enable the checking person to establish what income the taxi driver has made during the preceding accounting period. The taxi driver himself can, of course, be informed of his income in this manner. However, if the taximeter was not in the FREE position during actuation of the RT key, then it obviously has some other rate position, e.g., the rate I or rate II position. Then steps 2 and 4 are once again carried out, i.e., the new rate data are taken over from the tariff memory TPROM and made available for calculation.

If the rearward switching key RT according to 6 was also not actuated, then the sum key ST according to 9 is interrogated next. The sum key ST also has a double function. It serves, on the one hand, to form the sum of the additional charge and the fare price in the FREE position but, on the other hand, it also has the function of carrying out a check of the indicator in the FREE position. Thus, in 10, if the sum key was actuated it is first asked whether the taximeter is located in the FREE position. If, according to 10, the taximeter is in the FREE position during actuation of the sum key, then a checking indicator is carried out by switching through the indicator elements in all decades simultaneously from 0 to 1 to 2, etc. Another kind of check of the function capability of the taximeter can, of course, also be carried out in this manner; taken as a whole, a checking for the function ability of the taximeter is to be carried out by means of actuation of the sum key in the FREE position. But if the taximeter is not in the FREE position during the actuation of the sum key, then it is checked again according to 11 whether the sum key is possibly blocked. This checking is necessary because not all taximeters are equipped with an additional charge, in which case the sum key may have no function in the OCCUPIED position. But if the sum key is not blocked, then the sum is formed from the fare price and the additional charge according to program step 12 and is indicated, as a rule, on the indicator window 64 according to FIG. 2.

If the sum key was not pressed according to 9, then the additional charge key ZT is interrogated according to 13. If the additional charge key was actuated, then it is checked again according to 14 whether the additional charge key is blocked in this case, which will be the case if the taximeter in question is not equipped with an additional charge mechanism. According to 15, a further interrogation, whether a sum was already formed after actuation of the sum key, is effected and only if, according to 14 and 15, both interrogations have a negative result, will the corresponding additional charge be calculated according to 16, i.e., added in the additional charge memory and indicated on the indicator which is made visible on window 65. After interrogation of all four keys, the system program continues to operate.

It is clear from the above description of the key interrogation program that it makes no difference in principle whether the key information in the tariff memory TPROM is stored or a jump instruction is stored. If the same function pattern is used throughout the country, then it would be advisable to deposit the corresponding key information with the key interrogation program in the system memory EPROM and to provide only corresponding jump instructions in the tariff memory TPROM. If differences in the tariff structures are to be determined from city to city in a country, then it may be advisable to deposit the key information together with the corresponding tariff data in the tariff memory TPROM.

Essential to the key interrogation according to FIG. 7 is that a fully determined function is not assigned here to the keys, rather, depending on circumstances, either several functions, such as is the case, for example, in the two keys RT and ST, or an entire function sequence, such as is the case in the keys VT and RT, are assigned to the keys.

When a larger quantity of keys is employed, however, the chief aim should be to make control easier to oversee and this is substantially achieved in that preferably only one function is assigned to each key. In the key interrogation control according to FIG. 8, for example, eight keys A1 through A8 are present which, in this case, have the following functions: FREE FR, Rate 1 T1, Rate II T2, Rate III T3, Rate IV T4, CASH K, SUM ST, ADDITIONAL CHARGE ZT. However, such taximeters in which four rates are required are seldom needed, FIG. 9 shows an additional example for a key interrogation control in which the following functions can be controlled by means of eight keys: FREE FR, Rate 1 T1, Rate II T2, CASH K, SUM ST, CHECKING COUNTER INTERROGATION KA, TEST PROGRAM PP, TIME OF DAY INDICATOR TZ.

According to FIG. 8, the key interrogation program is again a sub-program of the system program. According to 20, the determination, whether any key signal at all is present, is effected first. If no key signal is present, a system program can be continued without carrying out the key interrogation. If a key signal is present, this key signal, according to FIG. 1, provided in accordance with the hardware, is recoded to the code proper to the system according to 21. The eight key codes are then interrogated one after the other beginning with the FREE key. If it was actuated, then a further decision is made about whether the taximeter was already previously found in the FREE state. In this respect, step 22 is referred to. In a sub-program, a checking counter call is carried out if the taximeter is in the FREE position, i.e., the checking data are transmitted one after the other from the main memory RAM to the indicator. As long as this program operates, some other key actuation must, of course, cause a disturbance so that during this time the keys must be ineffectually switched. This is effected by means of interrogating whether the checking counter call according to 22 was terminated during actuation of the FREE key. Thus, in the FREE position, 24 releases the checking counter call according to 22, on the one hand, but, on the other hand, effects a blocking of other functions as long as 22 is not terminated.

According to 25, however, the taximeter can also only be switched from the CASH position to the FREE position. An interrogation of whether the previous state was the CASH state is effected for this reason. According to 26, T1 for Rate I is first interrogated. If it is actuated, then it is first determined, according to 27, whether the switching-on was effected from the FREE position. In this case, the preparation of the switched-on state 29 is effected in that different resetting operations are carried out and only after this are the rate data for Rate I loaded (28). If the switching-on of Rate I is not effected from the FREE position but, e.g., from the position for Rate II, then step 29 is skipped and, according to 28, the rate data for Rate I are immediately fed in to the corresponding memory from the tariff memory TPROM.

In the same way, the interrogation of keys T2, T3, and T4 for Rates II through IV, 30, 31, and 32 are effected one after the other. According to 33, the CASH key is interrogated next. In this case, according to 34, the CASH data are removed from the tariff-PROM. This is chiefly a question of switching off the time drive while the distance data remains substantially retained. According to 35, the sum key is then interrogated. If the taximeter is in the FREE position, in this case according to 36, then no sum formation can be effected. However, if the taximeter is found in one of the positions T1 through T4 or K, then it is additionally determined according to 37 whether the sum key is blocked in this case, which will always be the case if the taximeter is not constructed with an additional charge. If the sum key is not blocked, then the sum is formed according to 38 and appears in the indicator window 64 according to FIG. 2. Lastly, the additional charge key ZT is interrogated. If it is pressed, then an interrogation whether the taximeter is found in the FREE position and whether possibly the additional charge key is blocked, is then effected according to 40 and 41. In the FREE position, no additional charges may be fed in and if the taximeter has no additional charge function, the additional charge key may also not compute additional charges. Only then is the additional charge computed according to 42.

In the following, the key interrogation control according to FIG. 9 will be briefly discussed. With respect to the program steps 43 through 59, there is an identity with the program according to FIG. 8 (program steps 20 to 38) so that with reference to the latter, no further explanation is necessary. The only exception is that, in this case, not four rate keys T1 through T4, but only two rate keys T1 and T2 are interrogated so that the program steps 31 and 32 according to FIG. 8 are omitted.

What is new in the key interrogation program according to FIG. 9 is that the functions of checking counter call KA, test program PP and time of day indicator TZ are now assigned to three keys here. After interrogation of the sum key according to 56 through 59, the interrogation of key KA is effected. The checking counter call can only be effected in the FREE position. Thus, if the taximeter is not in the FREE position, nothing happens. On the other hand, if the taximeter is in the FREE position, the program for the checking counter call according to 162 runs, i.e., the checking counter states are removed from the main memory RAM and transmitted one after the other to the indicator AZ.

According to 163, the key for releasing the test program PP is the next to be interrogated. The test program can, of course, only be effected in the FREE position. For this reason, according to 164, an interrogation, whether the taximeter is located in the FREE position, is effected in addition. After this, the test program is carried out. The kind of test program is arbitrary; at any rate, the test program must enable the taxi driver as well as, e.g., a maintenance technician, to carry out this function test of the taximeter in order to reach some conclusions on the type of malfunction.

Since every taximeter is also provided with a time generator, it is obvious to store the time of day in a memory of the RAM as well. In order to make the time visible, a key must be pressed which is designated according to 166 as time of day key TZ. However, indication of the time according to 168 is only effected if, according to 167, the taximeter is in the FREE position.

In FIGS. 7 through 9, key interrogation controls were described which work with four or eight keys, respectively. But, of course, a different quantity of keys is also possible in the corresponding programming. The key strip 72 makes it possible to provide any desired quantity of keys between one and eight. If more than eight functions should be called for, then there remains no other possibility but to assign several functions to one or more keys, which, of course, is possible, as described in the key interrogation program according to FIG. 7 of the two keys RT and ST.

While the foregoing description and drawings represent the preferred embodiments of the present invention, it will be obvious to those skilled in the art that various changes and modifications may be made without departing from the true spirit and scope of the present invention.

What is claimed is:

1. In a system for controlling an electronic taximeter with respect to different switched states by means of keys which provide coded signals to an input circuit by way of a coder matrix, said taximeter having a housing, the improvement comprising:
   a key strip provided on said housing, said strip for holding a predetermined number of keys, up to a maximum number of keys;
   a number of switches corresponding to the maximum number of keys being provided in said housing;
   tariff memory means for storing tariff information;
   system memory means for storing system program information; and
   key information being stored in the tariff memory means for triggering different key interrogation cycles in the system program by means of which a plurality of functions are assignable to a key when a quantity of keys less than a predetermined number are available and for assigning only one function to a key when the available keys exceed said predetermined number.

2. A system of claim 1, wherein said maximum number of keys is 8.

3. In a system for controlling an electronic taximeter with respect to different switched states by means of keys which provide coded signals to an input circuit by way of a coder matrix, said taximeter having a housing, the improvement comprising:
   a key strip provided on said housing, said strip for holding a predetermined number of keys, up to a maximum number of keys;
   a number of switches corresponding to the maximum number of keys being provided in said housing;
   tariff memory means for storing tariff information;
   system memory means for storing system program information; and
   key information being stored in the tariff memory means for triggering different key interrogation cycles in the system program by means of which a plurality of functions are assignable to a key coding when a quantity of key codings less than the predetermined number are available and for assigning only one function to a key coding when the available keys exceed said predetermined number.

4. A system according to claim 1 or claim 3, wherein said tariff memory is a PROM and the system memory means includes at least one EPROM.

5. A system according to claim 4, wherein said system program information is arranged in two EPROM units, the first EPROM containing the key interrogation program when the number of keys is less than the predetermined number and the second EPROM containing the key interrogation program when the number of keys is greater than the predetermined number.

6. A system according to claim 1 or claim 3, wherein said key strip contains a recess for each of the maximum number of keys provided, said recess for accepting one of the following: a key with a corresponding spring which projects over said key strip and a fill-in piece for closing said recess in a planar manner.

7. A system according to claim 6, wherein the housing includes a front frame for holding said key strip and wherein, on the reverse side of the front frame, projections are provided for guiding said keys and said fill-in pieces and wherein said fill-in pieces lock in a catch-like manner on said projections.

8. A system according to claim 7, wherein said arrangement includes a front face plate, and wherein said projections and said fill-in pieces simultaneously serve to fasten said front face plate to the housing on corresponding shoulders of the face plate.

9. A system according to claim 8, wherein said shoulders of said front face plate serve as support surfaces and movement restriction surfaces for said keys and their corresponding springs.

10. A system according to claim 7, wherein said keys have a color differing from the color of said front frame while said fill-in pieces have the same color as said front frame.

11. A system according to claim 1 or claim 3, wherein said key strip contains a recess for each of the maximum number of keys provided, said recess for accepting one of the following: a key with a corresponding spring which projects over said key strip and a fill-in piece for closing said recess in a set-back manner.

* * * * *